United States Patent
Hiraguchi et al.

(10) Patent No.: US 11,518,144 B2
(45) Date of Patent: Dec. 6, 2022

(54) LAMINATED METAL SHEET FOR METAL CONTAINER LID AND METHOD FOR MANUFACTURING THE SAME

(71) Applicant: JFE Steel Corporation, Tokyo (JP)

(72) Inventors: Tomonari Hiraguchi, Tokyo (JP); Yasuhide Oshima, Tokyo (JP); Katsumi Kojima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 851 days.

(21) Appl. No.: 16/307,316

(22) PCT Filed: May 15, 2017

(86) PCT No.: PCT/JP2017/018141
§ 371 (c)(1),
(2) Date: Dec. 5, 2018

(87) PCT Pub. No.: WO2017/217159
PCT Pub. Date: Dec. 21, 2017

(65) Prior Publication Data
US 2019/0134950 A1 May 9, 2019

(30) Foreign Application Priority Data
Jun. 17, 2016 (JP) .............................. JP2016-120339

(51) Int. Cl.
*B32B 15/09* (2006.01)
*B32B 15/18* (2006.01)
*B32B 27/36* (2006.01)
*B32B 37/10* (2006.01)
*B32B 37/14* (2006.01)

(52) U.S. Cl.
CPC .............. *B32B 15/09* (2013.01); *B32B 15/18* (2013.01); *B32B 27/36* (2013.01); *B32B 37/10* (2013.01); *B32B 37/144* (2013.01); *B32B 2307/514* (2013.01); *B32B 2311/30* (2013.01); *B32B 2367/00* (2013.01); *B32B 2439/66* (2013.01); *B32B 2439/70* (2013.01)

(58) Field of Classification Search
CPC ......... B32B 15/00; B32B 15/08; B32B 15/09; B32B 1/02; B32B 27/16; B32B 27/36; B32B 2435/02; B32B 2435/66; B32B 2307/518; B32B 2311/24; B32B 2439/70; B32B 37/04; B32B 2367/00; B32B 15/0011; B32B 15/016; B32B 15/20; B32B 2250/03; B32B 2307/30; B65D 1/40; Y10T 428/31681; B29C 48/022; B29C 48/154
USPC ...................... 428/35.8, 35.9, 458
See application file for complete search history.

(56) References Cited

U.S. PATENT DOCUMENTS

| 8,808,844 B2 | 8/2014 | Niederst et al. |
| 2003/0031859 A1 | 2/2003 | Sinsel et al. |
| 2005/0014011 A1* | 1/2005 | Oya ....................... G02B 1/115 |
| | | 428/480 |
| 2007/0036995 A1 | 2/2007 | Suzuki et al. |
| 2008/0261063 A1* | 10/2008 | Yamanaka ................ B32B 1/02 |
| | | 428/483 |
| 2011/0220645 A1 | 9/2011 | Niederst et al. |
| 2014/0162055 A1* | 6/2014 | Kitagawa ................ B32B 27/18 |
| | | 428/336 |
| 2016/0355294 A1 | 12/2016 | Yamanaka et al. |
| 2017/0008256 A1 | 1/2017 | Yamanaka et al. |

FOREIGN PATENT DOCUMENTS

| CN | 104369466 A | 2/2015 |
| EP | 3109042 A1 | 12/2016 |
| EP | 3278980 A1 | 2/2018 |
| JP | 0257339 A | 2/1990 |
| JP | 04105931 A | 4/1992 |
| JP | 05212788 A | 8/1993 |
| JP | 2004122577 A | 4/2004 |
| JP | 2004345232 A | 12/2004 |
| JP | 2005254628 A * | 9/2005 |
| JP | 2005254628 A | 9/2005 |
| JP | 3924239 B2 | 6/2007 |
| JP | 4149226 B2 | 9/2008 |
| JP | 4361208 B2 | 11/2009 |

(Continued)

OTHER PUBLICATIONS

International Search Report and Written Opinion for International Application No. PCT/JP2017/018141, dated Aug. 8, 2017—5 pages.
Database WPI, Week 199014, Thomson Scientific, AN 1990-104984, XP002797145, Feb. 27, 1990, 2 pages.
Database WPI, Week 199338, Thomson Scientific, AN 1993-299300, XP002797146, Aug. 24, 1993, 2 pages.
Extended European Search Report for European Application No. 17 813 062.1, dated Feb. 5, 2020, 11 pages.
European Communication Pursuant to Article 94(3) for European Application No. 17813062.1, dated Dec. 16, 2020, 5 pages.

(Continued)

*Primary Examiner* — Lee E Sanderson
(74) *Attorney, Agent, or Firm* — RatnerPrestia

(57) ABSTRACT

A laminated metal sheet for a metal container lid includes a polyester resin layer formed on a metal sheet. The polyester resin layer is composed of an A and a B layer, wherein the melting point of the A layer is lower than the melting point of the B layer by 20° C. or more, the A layer includes a molten layer where the value of the ratio of a peak intensity $I_{0°}$ to a peak intensity $I_{90°}$ is 1.5 or less, the B layer includes an orientation layer where the value of the ratio of the peak intensity $I_{0°}$ to the peak intensity $I_{90°}$ is 3.0 or more, the thickness of the A layer is within the range from 5 μm or more to less than 30 μm, and the thickness of the B layer is within the range from 0.5 μm or more to less than 6.0 μm.

4 Claims, No Drawings

(56) References Cited

FOREIGN PATENT DOCUMENTS

| | | |
|---|---|---|
| JP | 4506101 B2 | 7/2010 |
| JP | 4667595 B2 | 4/2011 |
| JP | 4725025 B2 | 7/2011 |
| JP | 4774599 B2 | 9/2011 |
| WO | 2015125184 A1 | 8/2015 |
| WO | 2015125185 A1 | 8/2015 |
| WO | 2015125461 A1 | 8/2015 |

OTHER PUBLICATIONS

Chinese Office Action with Search Report for Chinese Application No. 201780035131.5, dated Mar. 4, 2020, 7 pages.

* cited by examiner

LAMINATED METAL SHEET FOR METAL CONTAINER LID AND METHOD FOR MANUFACTURING THE SAME

CROSS REFERENCE TO RELATED APPLICATIONS

This is the U.S. National Phase application of PCT/JP2017/018141, filed May 15, 2017, which claims priority to Japanese Patent Application No. 2016-120339, filed Jun. 17, 2016, the disclosures of each of these applications being incorporated herein by reference in their entireties for all purposes.

FIELD OF THE INVENTION

The present invention relates to a laminated metal sheet for a metal container lid, and particularly used for a steel-sheet-made lid, a part or the substantially whole area of the steel-sheet-made lid that is easily opened by hand without using a can opener (hereinafter, referred to as an easy open end (EOE)), and a method for manufacturing the laminated metal sheet.

BACKGROUND OF THE INVENTION

In recent years, laminating resin coating of a can material has been developing. For example, in a beverage can, the bottom and the body of a two-piece can and the body of a three-piece can have been laminated. Reasons for this increase in laminating of the can material include streamlining a manufacturing process through omission of a coating/printing process, reducing environmental impact through the omission of a solvent drying process (baking process), avoiding elution of an environmental hormone such as BPA contained in a coating material, and the like. In particular, with respect to the environmental hormone, a slight amount of the BPA reportedly has an effect on a human body, and thus the regulation of the environmental hormone has been increasingly enhanced. Furthermore, in general, since a food can is greater in the amount of BPA elution than a beverage can, it is predicted that the laminating of the food can will also be promoted.

However, in the actual market, in the case of the beverage can, for example, the laminating of the bottom part and the body of the two-piece can has been developing, while the laminating of the upper lid and the base lid of the three-piece can has not. Also, the laminated lid of the food can is not popularized. It is considered that the laminating of a can lid material has not been developing as described above because problems unique to the can lid are left unsolved. That is, properties required for the can lid material include not only a flavor-retaining property and a barrier property but also a contents taking-out property, or the like. Furthermore, in the EOE, which is a type of the can lid, when the can lid is opened, there exists the case that a film is not cut along a score groove, and a phenomenon in which the film formed in a feather shape remains (feathering) occurs, and a can-opening property is also required. Conventionally, various techniques have been proposed with respect to these requirements.

For example, Patent Literature 1 describes a technique of increasing the degree of crystallization of a laminated film at the time of manufacturing a laminate can lid, and suppressing the adsorption of a taste or aroma component (flavor) thus improving the flavor-retaining property. Furthermore, Patent Literature 2 describes a technique of adding wax to the outer surface of a two-layered film thus improving the contents taking-out property, and acquiring a laminated metal sheet with improved moldability, impact resistance, and appearance. Furthermore, Patent Literature 3 describes a technique of arranging a high orientation layer in the outer surface of a two-layered film, and arranging a low orientation layer in a core portion of the two-layered film thus acquiring a laminated metal sheet capable of corresponding to various processing conditions that occur in the laminated metal sheet in manufacturing a lid, and preventing film fractures in manufacturing the lid. Furthermore, Patent Literature 4 describes a technique of specifying conditions of the EOE in detail thus acquiring a laminated metal sheet from which a lid with improved can-opening property can be manufactured. In addition, Patent Literature 5 describes a technique of arranging a film composed of two layers having respective melting points different from each other on the inner-surface side of a can thus achieving both the scraping resistance of an exterior film and the corrosion resistance of an interior film.

With such techniques, the requirements mentioned above can surely be acquired. However, the raw material for the latest EOE requires further improvements in flavor-retaining property, barrier property, and can-opening property, and it is difficult to achieve simultaneously all the requirements. Consequently, even when the flavor-retaining property and the barrier property can be ensured, the feathering may occur thus decreasing sharply the market value of the EOE. The feathering deteriorates the appearance of the lid and, at the same time, causes insanitary conditions due to contents adhering to the film left on the lid. Thus, improvement is required with respect to the feathering.

On the other hand, Patent Literature 6 describes a raw material constituted of a film composed of two layers each of which adjusts the polyester component and crystallinity thereof, and thereby having the above-mentioned properties in a balanced manner. Furthermore, Patent Literature 7 describes a laminated lid with improved openability, the laminated lid, which is provided with a score processing portion in the panel part thereof, specifying the weight average molecular weight and polydispersity of a resin layer in a score part or in the vicinity of the score part, suppressing the stretch of a film, and suppressing the feathering of the film. In addition, Patent Literature 8 describes a laminated lid that uses a two-layered film, and leaves an orientation layer in the upper layer of the film thus achieving non-repairing properties of the inner-surface of the EOE, and ensuring the corrosion resistance and the feathering suppression thereof.

PATENT LITERATURE

Patent Literature 1: Japanese Patent No. 4361208
Patent Literature 2: Japanese Patent No. 3924239
Patent Literature 3: Japanese Patent No. 4725025
Patent Literature 4: Japanese Patent No. 4506101
Patent Literature 5: Japanese Patent No. 4667595
Patent Literature 6: Japanese Patent No. 4149226
Patent Literature 7: Japanese Patent No. 4774599
Patent Literature 8: Japanese Patent Application Laid-open No. H4-105931

SUMMARY OF THE INVENTION

However, in the techniques described in Patent-Literature 6, Patent-Literature 7, and Patent-Literature 8, since the mechanism for the feathering suppression is indefinite, the ensuring of feathering resistance property is insufficient, and there exists the case that a product fails a test at a customer site the test condition of which is strict. Accordingly, in order to improve the feathering resistance property, it is necessary to consider more detailed film constitutions.

The present invention has been made to overcome such problems, and it is an object of the present invention to provide a laminated metal sheet for a metal container lid with improved feathering resistance, and a method for manufacturing the laminated metal sheet for the metal container lid.

To solve the problem and achieve the object, a laminated metal sheet for a metal container lid according to an exemplary embodiment of the present invention includes: a polyester resin layer formed on a surface of a metal sheet, the surface of the metal sheet being located on the inner-surface side of a metal container after forming, wherein the polyester resin layer is composed of an A layer located so as to abut on the metal sheet, and a B layer located so as not to abut on the metal sheet, the melting point of the A layer is lower than the melting point of the B layer by 20° C. or more, the A layer includes a molten layer where the value of the ratio of a peak intensity $I_{0°}$ to a peak intensity $I_{90°}$ is 1.5 or less, the peak intensity $I_{0°}$ being attributed to C=O stretching vibration in the vicinity of Raman shift of 1730 $cm^{-1}$ obtained from the laser Raman spectroscopy method using a linearly polarized laser beam whose polarization plane is parallel to the surface of the A layer, the peak intensity $I_{90°}$ being attributed to C=O stretching vibration in the vicinity of Raman shift of 1730 $cm^{-1}$ obtained from the laser Raman spectroscopy method using a linearly polarized laser beam whose polarization plane is perpendicular to the surface of the A layer, the B layer includes an orientation layer where the value of the ratio of the peak intensity $I_{0°}$ to the peak intensity $I_{90°}$ is 3.0 or more, the thickness of the A layer is within the range from 5 µm or more to less than 30 µm, and the thickness of the B layer is within the range from 0.5 µm or more to less than 6.0 µm.

Moreover, in the laminated metal sheet for the metal container lid according to embodiments of the present invention, the A layer is composed of polyester resin containing polyethylene terephthalate as a main component, and copolymerized with 10 to 20% isophthalic acid as an acid component, and the B layer is composed of polyester resin containing 93% or more of polyethylene terephthalate.

Moreover, a method for manufacturing the laminated metal sheet for the metal container lid according to embodiments of the present invention is a method for manufacturing the laminated metal sheet including: a step of controlling the orientation property in the thickness direction of the polyester resin layer by controlling at least one of the temperature of the metal sheet, the temperature of a laminating roll, and the pressing pressures of the laminating roll, when the polyester resin layer is laminated to the metal sheet.

According to the present invention, it is possible to provide a laminated metal sheet for a metal container lid with improved feathering resistance property, and a method for manufacturing the laminated metal sheet for the metal container lid.

DETAILED DESCRIPTION OF EMBODIMENTS OF THE INVENTION

Hereinafter, the explanation is made with respect to a laminated metal sheet for a metal container lid, and a method for manufacturing the laminated metal sheet for the metal container lid in the present invention.

Metal Sheet

As a metal sheet according to an embodiment of the present invention, an aluminum sheet, a steel sheet, or the like that is extensively used as a metal container material can be used. In particular, it is desirable to use a surface treated steel sheet (hereinafter, referred to as TFS) on which a two-layer film constituted of a lower layer composed of a chromium metal and an upper layer composed of a chromium hydroxide is formed. Although the coating weight of each of a chromium metal layer and a chromium hydroxide layer of the TFS is not particularly limited, from the viewpoint of adhesiveness and corrosion resistant after processing, it is desirable that the coating weight of the chromium metal layer be set in the range from 70 to 200 $mg/m^2$ measured in Cr, and the coating weight of the chromium hydroxide layer be set in the range from 10 to 30 $mg/m^2$ measured in Cr.

Polyester Resin Layer

The polyester resin layer according to an embodiment of the present invention is formed on a surface of the metal sheet, the surface being located on the inner-surface side of a metal container after forming, and composed of two kinds of polyester resin layers different in composition from each other for making a difference in melting point, each of the polyester resin layers containing polyethylene terephthalate (PET) as a main component. That is, when the layer that abuts on the metal sheet is represented as an A layer, and the layer that does not abut on the metal sheet (the outer surface side of the metal container lid) is represented as a B layer, it is necessary to set the melting point of the A layer lower than the melting point of the B layer by 20° C. or more. In order to achieve such a constitution, to be more specific, for example, one side of the polyester resin layer that abuts on the metal sheet is constituted of the A layer containing polyethylene terephthalate as a main component, and copolymerized with 10 to 20% of isophthalic acid (I) as an acid component. On the other hand, the other side of the polyester resin layer that does not abut on the metal sheet (the outer surface side of the metal container lid) is constituted of the B layer containing 93% or more of polyethylene terephthalate. The A layer that abuts on the metal sheet is copolymerized with the isophthalic acid thus lowering the melting point of the A layer, and changing the orientation property steeply in the thickness direction of the polyester resin layer after lamination. Here, when the content of the isophthalic acid is less than 10%, the melting point difference between the A layer and the B layer is insufficient. As a copolymer component for making the melting point difference between the A layer and the B layer, the isophthalic acid that is preferred in terms of balance between the extensibility and strength of the film is named as an example. However, the present invention is not limited to this example, and the following substances are, for example, also preferred as dicarboxylic acid other than a terephthalic acid component of a dicarboxylic acid component; that is, aromatic dicarboxylic acid such as naphthalene dicarboxylic acid, diphenyldicarboxylic acid, diphenylsulfone dicarboxylic acid, diphenoxyethane, dicarboxylic acid, 5-sodium sulfoisophthalate, and phthalic acid, aliphatic dicarboxylic acid such as oxalic acid, succinic acid, adipic acid, sebacic acid, dimer acid, maleic acid, and fumaric acid, aliphatic dicarboxylic acid such as cyclohexynedicarboxylic acid, p-hydroxy benzoic acid, or the like.

Melting Point Difference Between A Layer and B Layer

When the melting point difference between the A layer and the B layer is small, the notch effect of the B layer that is described later is not easily generated, and the polyester resin layer is not easily fractured. Furthermore, the melting point of the A layer is lowered because the polyester resin layer and the metal sheet can be made to adhere sufficiently to each other at the time of lamination. Accordingly, the melting point difference between the A layer and the B layer is set to 20° C. or more.

Orientation Properties of A Layer and B Layer

The A layer includes a molten layer in which the value of the ratio of a peak intensity $I_{0°}$ to a peak intensity $I_{90°}$ is 1.5 or less, the peak intensity $I_{0°}$ being attributed to C=O stretching vibration in the vicinity of Raman shift of 1730 cm$^{-1}$ obtained from the laser Raman spectroscopy method using a linearly polarized laser beam whose polarization plane is parallel to the surface of the A layer, the peak intensity $I_{90°}$ being attributed to C=O stretching vibration in the vicinity of Raman shift of 1730 cm$^{-1}$ obtained from the laser Raman spectroscopy method using a linearly polarized laser beam whose polarization plane is perpendicular to the surface of the A layer. Furthermore, the B layer includes an orientation layer in which the value of the ratio of the peak intensity $I_{0°}$ to the peak intensity $I_{90°}$ is 3.0 or more. The A layer and the B layer are constituted in this manner because the easy-to-fracture property of the polyester resin layer can be improved due to the B layer arranged in the outer surface of the polyester resin layer.

To consider a case where the orientation property of the B layer becomes high, when the polyester resin layer deforms at the time of opening an EOE, the B layer fractures prior to the fracture of the A layer thus generating cracks easily. The cracks cause stress concentration and hence, the fracture progresses to the whole area of the polyester resin layer (notch effect). Furthermore, due to such constitution, the molten layer is sufficiently ensured at the time of lamination thus improving the adhesiveness of the polyester resin layer to the metal sheet. Consequently, when a score fractures at the time of opening the FOE, the polyester resin layer fractures along with the fracture of the metal sheet, and feathering is not easily generated.

Here, the value of the ratio of the peak intensity $I_{0°}$ to the peak intensity $I_{90°}$ in the B layer is set to 3.0 or more because when the value of the ratio of the peak intensity $I_{0°}$ to the peak intensity $I_{90°}$ is less than 3.0, the B layer does not easily generate the cracks therein, and the whole area of the polyester resin layer is inferior in fracture property. Furthermore, the upper limit of the ratio of the peak intensity $I_{0°}$ to the peak intensity $I_{90°}$ is set to 6.0 that is a substantial upper limit obtained under general lamination conditions.

Change in Orientation Property of Polyester Resin Layer in the Thickness Direction The thickness of the polyester resin layer required for changing from the molten layer in the A layer to the orientation layer in the B layer is within the range from 1 μm to 4 μm. The polyester resin layer according to an embodiment of the present invention changes from the A layer to the B layer as viewed from the metal-sheet side, and the more steeply the orientation property in the thickness direction changes, the more effectively the feathering can be suppressed. To be more specific, the more steeply the orientation property changes between the orientation layer in the B layer and the molten layer in the A layer, the larger the stress difference between the A layer and the B layer becomes when the polyester resin layer deforms at the time of opening the EOE thus obtaining larger notch effect. The notch effect is easily obtained along with the increase in melting point difference between the A layer and the B layer. When the thickness of the polyester resin layer required for changing from the molten layer in the A layer to the orientation layer in the B layer exceeds 4 μm, the stress difference is insufficient when the polyester resin layer deforms thus being inferior in the feathering resistance property. On the other hand, the lower limit of the thickness of the polyester resin layer required for changing from the molten layer in the A layer to the orientation layer in the B layer is 1 μm that is a substantial lower limit obtained under the general lamination conditions.

Thicknesses of Molten Layer and Orientation Layer

The thickness of the molten layer is within the range from 5 μm or more to less than 30 μm, and the thickness of the orientation layer is within the range from 0.5 μm or more to less than 6.0 μm. As mentioned above, in order to suppress the feathering, it is necessary to generate cracks effectively in the orientation layer, and to fracture the whole area of the polyester resin layer due to the notch effect. To consider a case where the thickness of the orientation layer is less than 0.5 μm, even when the cracks are generated in the outer surface of the polyester resin layer, it is impossible to obtain sufficient stress concentration and hence, it is impossible to obtain the notch effect such that the fracture of the polyester resin layer as a whole can be accelerated. On the other hand, when the thickness of the orientation layer is 6.0 μm or more, the thickness of the outer surface of the polyester resin layer is excessively large and hence, the cracks are not easily generated in the outer surface of the polyester resin layer. It is preferable that the molten layer be larger in thickness than the orientation layer. When the thickness of the molten layer is less than 5 μm, the ratio of the thickness of the orientation layer to the overall thickness of the polyester resin layer becomes large, and even in the case of the occurrence of the fracture, it is impossible to expect a feathering reduction effect due to the notch effect of the orientation layer. On the other hand, when the thickness of the molten layer is 30 μm or more, the overall thickness of the polyester resin layer excessively increases thus increasing the feathering.

Method for Manufacturing Laminated Metal Sheet for Metal Container Lid

The temperature of the metal sheet before lamination has a large influence on the change of the orientation property in the thickness direction of the polyester resin layer. The metal sheet is laminated after being heated at a temperature substantially ranging from a temperature equal to or higher than the melting point of the A layer to a temperature equal to or lower than the melting point of the B layer, thus the change of the orientation property in the thickness direction of the polyester resin layer after lamination becomes steep. On the other hand, when the temperature of the metal sheet is lower than the melting point of the A layer, orientation remaining in the A layer causes moderate change in orientation property. Furthermore, when the temperature of the metal sheet exceeds the melting point of the B layer, the orientation property of the B layer is lost thus causing moderate change of the orientation property in the same manner as above.

The temperature of a cooling-use laminating roll at the time of lamination is also an important requirement for controlling the orientation property in the thickness direction of the polyester resin layer. The temperature of the cooling-use laminating roll is lowered thus causing steep change of the orientation property in the thickness direction of the polyester resin layer. Here, although the temperature of the cooling-use laminating roll may be a temperature generally applicable to the cooling-use laminating roll, the temperature of the cooling-use laminating roll is preferably set to 70° C. or lower, and more preferably to 60° C. or lower.

The pressing pressure of the cooling-use laminating roll is also an important requirement for controlling the orientation property in the thickness direction of the polyester resin layer. When the pressing pressure of the cooling-use laminating roll is increased, the cooling due to the metal sheet is enhanced at the time of attaching the polyester resin layer to the metal sheet, and a cooling rate is increase thus causing steep change of the orientation property in the thickness direction of the polyester resin layer. However, when the pressing pressure of the cooling-use laminating roll is excessively increased, the wear of the cooling-use laminating roll is increased thus lowering production efficiency.

EXAMPLES

Method for Manufacturing Metal Sheet

A cold-rolled steel strip being made from the continuous casting slab of low-carbon Al-killed steel to which a hot-rolling treatment, a descaling treatment, a cold rolling treatment, an annealing treatment, and a temper rolling treatment are applied, the cold-rolled steel strip having a refining grade of T4CA and a thicknesses of 0.22 mm was used as the metal sheet to prepare the TFS to which a degreasing treatment and a pickling treatment are applied and thereafter, chromium metal plating (130 mg/m$^2$) and chromium oxide plating (15 mg/m$^2$) are applied by an electrolytic chromate treatment.

Method for Manufacturing Laminated Metal Sheet

Films were manufactured, as sample films, in accordance with the conditions in Table 1, and each of the films was laminated to the TFS sheet. The overall orientation property of the film was determined at the temperature of the surface of a steel sheet before lamination, and the change of the orientation property in the film thickness direction was controlled by the pressing pressure and the temperature of the cooling-use laminating roll to prepare a sample. The orientation property was evaluated by the value of the ratio of the peak intensity $I_{0°}$ to the peak intensity $I_{90°}$, the peak intensity $I_{0°}$ being attributed to C=O stretching vibration in the vicinity of Raman shift of 1730 cm$^{-1}$ obtained from the laser Raman spectroscopy method using a linearly polarized laser beam whose polarization plane is parallel to the surface of the A layer, the peak intensity $I_{90°}$ being attributed to C=O stretching vibration in the vicinity of Raman shift of 1730 cm$^{-1}$ obtained from the laser Raman spectroscopy method using a linearly polarized laser beam whose polarization plane is perpendicular to the surface of the A layer.

When the polarization plane and the molecular vibration of the laser beam are in the same plane, the peak intensity of the laser beam is enhanced thus evaluating the orientation property of a molecular chain by measuring the peak intensity. An evaluation sample was prepared by the following procedures; that is, the sample was cut out from the steel sheet along the cross-section in the manufacturing line direction of the steel sheet, resin-embedded and thereafter, ground on the cross-sectional surface thereof. As a laser Raman spectroscopy system, the Dispersive Raman Spectrometer, Nicolet Almega XR manufactured by Thermo Fisher Scientific Inc. was used, and as a linearly polarized laser beam, the 532-nm argon laser beam was used. The beam diameter of the linearly polarized laser beam was narrowed to measure the peak intensity at 1-μm pitch along the thickness direction, and the orientation property in the thickness direction of the polyester resin layer was examined in detail.

Method for Manufacturing Lid

The laminated steel sheet obtained as above was treated with a heat treatment twice for 10 minutes at 160° C. and for 10 minutes at 180° C., which is equivalent to a baking finish, and thereafter, subjected to an EOE lid forming process. A score part was adjusted using a score metal mold formed in a V-shape such that the sheet thickness of a score processing portion can be set to about 70 μm. A tab was attached to the EOE lid obtained, and a retort treatment was performed for 90 minutes at 125° C. under a humid environment.

Method for Measuring Feathering

After the retort treatment, the tab was raised, and a panel part and a peripheral ring part were separated from each other to open a can. After the can was opened, the length of the film remained in the ring part was measured, and evaluated as "Poor" when the length of the film exceeds 200 μm, as "Good" when the length of the film is 200 μm or less, and as "Excellent" when the length of the film is 100 μm or less.

Evaluation Result

The evaluation result is illustrated in Table 1 below. Each of the examples according to embodiments of the present invention in Table 1 indicates that the laminated metal sheet exhibited sufficient thickness and degree of orientation of the orientation layer, and steep change from the molten layer to the orientation layer thus exhibiting improved feathering resistance property. On the other hand, each of the comparative examples 1 to 3 indicates that the laminated metal sheet had the orientation layer being small in thickness (thickness=0.1 μm) and hence, sufficient stress concentration was not obtained even when cracks were generated in the outer surface of the orientation layer, and the notch effect of the orientation layer was insufficient. Consequently, the orientation layer was inferior in feathering resistance property. Although a comparative example 6 indicates that the laminated metal sheet of the comparative example 6 exhibited sufficient thickness (1.5 μm) of the orientation layer, the degree of orientation of the orientation layer was reduced (peak intensity ratio=2) and hence, cracks were not easily generated in the outer surface of the orientation layer, and the orientation layer was inferior in feathering resistance property.

Each of comparative examples 18 and 19 indicates that the laminated metal sheet exhibited insufficient degree of orientation of the orientation layer (peak intensity ratio=2) and hence, the orientation layer was inferior in feathering resistance property. Furthermore, although each of comparative examples 20, 33, and 40 indicates that the laminated metal sheet exhibited sufficient thickness and degree of orientation of the orientation layer, steep change from the molten layer to the orientation layer was not obtained (thickness L=7 to 8) and hence, the orientation layer was inferior in feathering resistance property.

Each of comparative examples 38 and 39 indicates that the laminated metal sheet exhibited excessively large film thickness as a whole and hence, film fracture was not easily generated, and the orientation layer was inferior in feathering resistance property. Each of comparative examples 41 and 42 indicates that the laminated metal sheet exhibited excessively large thickness of the orientation layer (thickness=10 μm) and hence, surface cracks were not easily generated, and the orientation layer was inferior in feathering resistance property. Each of comparative examples 43 to 48 indicates that the laminated metal sheet exhibited a small melting point difference between the A layer and the B layer thus exhibiting a small orientation difference between the orientation layer and the molten layer (melting point difference=11° C.), and exhibited insufficient ensuring of the adhesiveness at the time of lamination and hence, the orientation layer was inferior in feathering resistance property. Furthermore, although each of comparative examples 49 to 52 indicates that the laminated metal sheet exhibited large melting point difference between the A layer and the B layer, and large orientation difference between the orientation layer and the molten layer, the thickness of the orientation layer was large (thickness=7 μm or larger), and surface cracks were not easily generated and hence, the orientation layer was inferior in feathering resistance property. As mentioned above, according to embodiments of the present invention, it was evident that the laminated metal sheet for the metal container lid with improved feathering resistance property can be obtained.

Heretofore, although the embodiment to which the invention made by inventors is applied has been explained in conjunction with drawings, the present invention is not limited to the above-mentioned embodiment that merely constitutes one embodiment of the present invention. That is, various modifications and applications made by those skilled in the art or the like based on the present embodiment are arbitrarily conceivable without departing from the gist of the present invention.

TABLE 1

| No. | Orientation layer B layer | | | Molten layer A layer | | | Thickness from molten layer to orientation layer L | Melting point difference ° C. | Feathering resistance property | |
|---|---|---|---|---|---|---|---|---|---|---|
| | Orientation layer component | Thickness μm | Peak intensity ratio I0°/I90° | Molten layer component | Thickness μm | Peak intensity ratio I0°/I90° | | | | |
| 1 | PET (100) | 0.1 | 2 | PET (82)-I (18) | 15.9 | 1.1 | 7 | 38 | Poor | Comparative example |
| 2 | PET (100) | 0.1 | 4.5 | PET (82)-I (18) | 15.9 | 1.2 | 2 | 37 | Poor | Comparative example |
| 3 | PET (100) | 0.1 | 6 | PET (82)-I (18) | 15.9 | 1.2 | 2 | 38 | Poor | Comparative example |
| 4 | PET (100) | 1.5 | 6 | PET (88)-I (12) | 14.5 | 1.3 | 2 | 24 | Excellent | Example |
| 5 | PET (100) | 1.5 | 6 | PET (88)-I (12) | 14.5 | 1.3 | 2 | 24 | Excellent | Example |
| 6 | PET (100) | 1.5 | 2 | PET (82)-I (18) | 14.5 | 1.1 | 8 | 39 | Poor | Comparative example |
| 7 | PET (100) | 1.5 | 4.5 | PET (82)-I (18) | 14.5 | 1.2 | 2 | 39 | Good | Example |
| 8 | PET (100) | 1.5 | 6 | PET (82)-I (18) | 14.5 | 1.3 | 2 | 39 | Excellent | Example |
| 9 | PET (100) | 1.5 | 6 | PET (82)-I (18) | 14.5 | 1.3 | 1 | 39 | Excellent | Example |
| 10 | PET (100) | 1.5 | 6 | PET (80)-I (20) | 14.5 | 1.3 | 2 | 45 | Excellent | Example |
| 11 | PET (100) | 1.5 | 6 | PET (80)-I (20) | 14.5 | 1.3 | 2 | 45 | Excellent | Example |
| 12 | PET (100) | 1.5 | 4.5 | PET (82)-I (18) | 10.5 | 1.3 | 2 | 45 | Excellent | Example |
| 13 | PET (100) | 1.5 | 6 | PET (82)-I (18) | 10.5 | 1.3 | 2 | 45 | Excellent | Example |
| 14 | PET (100) | 2 | 4.5 | PET (88)-I (12) | 14 | 1.3 | 3 | 24 | Good | Example |
| 15 | PET (100) | 2 | 4.5 | PET (88)-I (12) | 14 | 1.3 | 2 | 24 | Good | Example |
| 16 | PET (100) | 2 | 4.5 | PET (88)-I (12) | 14 | 1.3 | 1 | 24 | Excellent | Example |
| 17 | PET (100) | 2 | 6 | PET (80)-I (20) | 14 | 1.4 | 1 | 45 | Excellent | Example |
| 18 | PET (100) | 2 | 2 | PET (82)-I (18) | 14 | 1.1 | 7 | 38 | Poor | Comparative example |
| 19 | PET (100) | 2 | 2 | PET (82)-I (18) | 14 | 1.1 | 8 | 38 | Poor | Comparative example |
| 20 | PET (100) | 2 | 4.5 | PET (82)-I (18) | 14 | 1.3 | 7 | 38 | Poor | Comparative example |
| 21 | PET (100) | 2 | 4.5 | PET (82)-I (18) | 14 | 1.3 | 3 | 38 | Good | Example |
| 22 | PET (100) | 2 | 4.5 | PET (82)-I (18) | 14 | 1.3 | 2 | 38 | Good | Example |
| 23 | PET (100) | 2 | 4.5 | PET (82)-I (18) | 14 | 1.3 | 1 | 38 | Excellent | Example |
| 24 | PET (100) | 2 | 6 | PET (82)-I (18) | 14 | 1.4 | 1 | 38 | Excellent | Example |
| 25 | PET (100) | 2 | 4.5 | PET (80)-I (20) | 14 | 1.3 | 3 | 45 | Good | Example |
| 26 | PET (100) | 2 | 4.5 | PET (80)-I (20) | 14 | 1.3 | 2 | 45 | Good | Example |
| 27 | PET (100) | 2 | 4.5 | PET (80)-I (20) | 14 | 1.3 | 1 | 45 | Excellent | Example |
| 28 | PET (100) | 2 | 6 | PET (80)-I (20) | 14 | 1.4 | 1 | 45 | Excellent | Example |
| 29 | PET (100) | 3 | 4.5 | PET (82)-I (18) | 21 | 1.3 | 1 | 45 | Excellent | Example |
| 30 | PET (100) | 3 | 6 | PET (82)-I (18) | 21 | 1.4 | 1 | 45 | Excellent | Example |
| 31 | PET (100) | 5 | 4.5 | PET (88)-I (12) | 10 | 1.3 | 2 | 24 | Good | Example |
| 32 | PET (100) | 5 | 6 | PET (88)-I (12) | 10 | 1.4 | 2 | 24 | Good | Example |
| 33 | PET (100) | 5 | 2 | PET (82)-I (18) | 10 | 1.2 | 8 | 39 | Poor | Comparative example |
| 34 | PET (100) | 5 | 4.5 | PET (82)-I (18) | 10 | 1.3 | 2 | 39 | Good | Example |
| 35 | PET (100) | 5 | 6 | PET (82)-I (18) | 10 | 1.4 | 2 | 39 | Good | Example |
| 36 | PET (100) | 5 | 4.5 | PET (80)-I (20) | 10 | 1.3 | 2 | 45 | Good | Example |
| 37 | PET (100) | 5 | 6 | PET (80)-I (20) | 10 | 1.4 | 2 | 45 | Good | Example |
| 38 | PET (100) | 5 | 4.5 | PET (82)-I (18) | 35 | 1.3 | 2 | 45 | Poor | Comparative example |
| 39 | PET (100) | 5 | 6 | PET (82)-I (18) | 35 | 1.4 | 2 | 45 | Poor | Comparative example |
| 40 | PET (100) | 10 | 2 | PET (82)-I (18) | 6 | 1.2 | 7 | 38 | Poor | Comparative example |
| 41 | PET (100) | 10 | 4.5 | PET (82)-I (18) | 6 | 1.3 | 3 | 38 | Poor | Comparative example |
| 42 | PET (100) | 10 | 6 | PET (82)-I (18) | 6 | 1.4 | 2 | 38 | Poor | Comparative example |
| 43 | PET (100) | 2 | 4.7 | PET (94)-I (6) | 15 | 1.4 | 3 | 11 | Poor | Comparative example |
| 44 | PET (100) | 1 | 4.6 | PET (94)-I (6) | 15 | 1.4 | 4 | 11 | Poor | Comparative example |
| 45 | PET (100) | 4 | 4.5 | PET (94)-I (6) | 13 | 1.4 | 3 | 11 | Poor | Comparative example |
| 46 | PET (100) | 2 | 4.7 | PET (94)-I (6) | 25 | 1.4 | 3 | 11 | Poor | Comparative example |
| 47 | PET (100) | 2 | 5.3 | PET (94)-I (6) | 10 | 1.5 | 2 | 11 | Poor | Comparative example |
| 48 | PET (100) | 2 | 5.4 | PET (94)-I (6) | 17 | 1.5 | 1 | 11 | Poor | Comparative example |
| 49 | PET (100) | 10 | 4.5 | PET (78)-I (22) | 2 | 1.5 | 2 | 42 | Poor | Comparative example |

TABLE 1-continued

| | Orientation layer B layer | | | Molten layer A layer | | | Thickness from molten layer to orientation layer L | Melting point difference ° C. | Feathering resistance property | |
|---|---|---|---|---|---|---|---|---|---|---|
| No. | Orientation layer component | Thickness μm | Peak intensity ratio I0°/I90° | Molten layer component | Thickness μm | Peak intensity ratio I0°/I90° | | | | |
| 50 | PET (100) | 24 | 4.5 | PET (75)-I (25) | 0.5 | 1.5 | 2 | 68 | Poor | Comparative example |
| 51 | PET (100) | 13 | 4.5 | PET (79)-I (21) | 16 | 1.5 | 2 | 43 | Poor | Comparative example |
| 52 | PET (100) | 7 | 4.5 | PET (77)-I (23) | 2 | 1.5 | 2 | 60 | Poor | Comparative example |
| 53 | PET (93)-I (7) | 2 | 4.5 | PET (82)-I (18) | 14 | 1.3 | 1 | 22 | Good | Example |
| 54 | PET (93)-I (7) | 2 | 4.5 | PET (80)-I (20) | 14 | 1.3 | 1 | 26 | Good | Example |

INDUSTRIAL APPLICABILITY

According to the present invention, it is possible to provide a laminated metal sheet for a metal container lid with improved feathering resistance property, and a method for manufacturing the laminated metal sheet for the metal container lid.

The invention claimed is:

1. A laminated metal sheet for a metal container lid, comprising a polyester resin layer formed on a surface of a metal sheet, the surface of the metal sheet being located on the inner-surface side of a metal container after forming, wherein:
   the polyester resin layer is composed of an A layer located so as to abut on the metal sheet, and a B layer disposed over the A layer,
   the melting point of the A layer is lower than the melting point of the B layer by 20° C. or more,
   the A layer includes a molten layer, where a value of a peak intensity ratio A of a peak intensity $I_{0°}$ to a peak intensity $I_{90°}$ is 1.5 or less, disposed over the metal sheet,
   the B layer includes an orientation layer, where a value of a peak intensity ratio B of a peak intensity $I_{0°}$ to a peak intensity $I_{90°}$ is 3.0 or more,
   the peak intensity $I_{0°}$ being attributed to C=O stretching vibration in the vicinity of Raman shift of 1730 cm$^{-1}$ obtained from a laser Raman spectroscopy method using a linearly polarized laser beam whose polarization plane is parallel to the surfaces of the A layer and the B layer, the peak intensity $I_{90°}$ being attributed to C=O stretching vibration in the vicinity of Raman shift of 1730 cm$^{-1}$ obtained from the laser Raman spectroscopy method using a linearly polarized laser beam whose polarization plane is perpendicular to the surface of the A layer and the B layer,
   the thickness of the A layer is within the range from 5 μm or more to less than 30 μm, the thickness of the B layer is within the range from 0.5 μm or more to less than 6.0 μm, and
   the polyester resin layer has a thickness of a transition region from the molten layer having a peak intensity ratio A, in the layer A to the orientation layer, having the peak intensity ratio B, in the B layer, within a range from 1 μm to 4 μm.

2. The laminated metal sheet for the metal container lid according to claim 1, wherein the A layer is composed of polyester resin containing polyethylene terephthalate as a main component, and copolymerized with 10 to 20% isophthalic acid as an acid component, and the B layer is composed of polyester resin containing 93% or more of polyethylene terephthalate.

3. A method for manufacturing the laminated metal sheet for the metal container lid according to claim 1, the method comprising:
   a step of controlling the orientation property in the thickness direction of the polyester resin layer by controlling at least one of the temperature of the metal sheet, the temperature of a laminating roll, and the pressing pressures of the laminating roll, when the polyester resin layer is laminated to the metal sheet.

4. A method for manufacturing the laminated metal sheet for the metal container lid according to claim 2, the method comprising:
   a step of controlling the orientation property in the thickness direction of the polyester resin layer by controlling at least one of the temperature of the metal sheet, the temperature of a laminating roll, and the pressing pressures of the laminating roll, when the polyester resin layer is laminated to the metal sheet.

* * * * *